[12] United States Patent  
Treinen (10) Patent No.: US 7,681,132 B2  
(45) Date of Patent: Mar. 16, 2010

(54) SYSTEM, METHOD AND PROGRAM PRODUCT FOR VISUALLY PRESENTING DATA DESCRIBING NETWORK INTRUSIONS

(75) Inventor: James J. Treinen, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 11/486,742

(22) Filed: Jul. 13, 2006

(65) Prior Publication Data

US 2008/0016208 A1 Jan. 17, 2008

(51) Int. Cl.  
*G06F 3/00* (2006.01)  
*G06F 15/177* (2006.01)

(52) U.S. Cl. .................................. 715/736; 715/741

(58) Field of Classification Search .............. 715/736, 715/763, 764, 853, 741, 743; 709/223, 224, 709/225  
See application file for complete search history.

(56) References Cited

U.S. PATENT DOCUMENTS

| 6,535,227 | B1 | 3/2003 | Fox et al. .................... 345/736 |
| 6,711,127 | B1 | 3/2004 | Gorman et al. ............. 370/230 |
| 6,906,709 | B1 | 6/2005 | Larkin et al. ................ 345/419 |
| 7,293,238 | B1 * | 11/2007 | Brook et al. ................ 715/736 |
| 7,346,675 | B2 * | 3/2008 | Givoly et al. ................ 709/223 |
| 2002/0078202 | A1 | 6/2002 | Ando et al. .................. 709/225 |
| 2003/0208616 | A1 | 11/2003 | Laing et al. .................. 709/236 |
| 2004/0008628 | A1 * | 1/2004 | Banerjee ..................... 370/468 |
| 2005/0138413 | A1 | 6/2005 | Lippmann et al. ............ 713/201 |

FOREIGN PATENT DOCUMENTS

JP 2005-012312 1/2005

OTHER PUBLICATIONS

Kim, et al., *Real-time visualization of network attacks on high-speed links*, Korea Univ, Seoul, IEEE Network, vol. 18, No. 5, p. 30-9, Sep.-Oct. 2004, http://widen.korea.ac.kr/radar.pdf.

* cited by examiner

*Primary Examiner*—Weilun Lo  
*Assistant Examiner*—Truc T Chuong  
(74) *Attorney, Agent, or Firm*—Arthur J. Samodovitz (57) ABSTRACT

Computer system, method and program for graphically representing network intrusions. Source icons are displayed in rows in a first column. The source icons represent source IP addresses from which intrusions were sent. Destination icons are displayed in rows in a second column. The destination icons represent destination IP addresses to which the intrusions were sent. The destination icons that receive intrusions from a same source icon are clustered together in the graphical representation across from the same source icon. An arrow is displayed from each of the source icons pointing to each of the destination icons to which each source icon sent an intrusion, such that there are "N" arrows from each source icon to "N" destination icons to which each source icon sent at least one intrusion.

19 Claims, 4 Drawing Sheets

SYSTEM, METHOD AND PROGRAM PRODUCT FOR VISUALLY PRESENTING DATA DESCRIBING NETWORK INTRUSIONS

FIELD OF THE INVENTION

The present invention relates generally to network security, and more specifically to an effective technique to visually present data describing network intrusions.

BACKGROUND OF THE INVENTION

Networks such as the Internet, Local Area Network, Extranets and Intranets are common today. Networks typically comprise communication media, routers, network switches, firewalls. Computers such as client computers and servers are connected to networks.

Network security is important, especially when the network and the computers on the network are connected to the Internet. There are various types of malicious "intrusions" that can jeopardize a network. Examples of malicious intrusions are viruses, worms, denial of service attacks, and buffer overflow attacks.

There are various known techniques to protect against such intrusions. A firewall at the gateway to the network or within a computer can block (a) messages containing a known electronic signature of a virus or worm, (b) all messages from source IP addresses known from experience to be malicious, (c) messages containing words characteristic of spam, (d) some or all messages from source IP addresses which are sending an unusually large number of messages to the same destination IP address, (e) all messages sent from a source IP address to a destination IP address which should not receive messages from this source, (f) entire networks which are known to be malicious and (g) entire countries for which there is no legitimate reason to allow network traffic. While these techniques are generally effective, some of the techniques require an identification, compilation and analysis of likely sources of the intrusions, their destinations, known malicious ports and attack signatures in order to determine the proper corrective action. It was known to provide a table which lists for each destination IP address the source IP addresses of messages sent to this destination IP address, to help identify malicious attacks. While these techniques are accurate and comprehensive in the information they present, there is typically too much data for a human to readily and effectively analyze when presented in this form.

Accordingly, an object of the present invention is to visually present intrusion data in a manner which a human can readily and effectively analyze.

Another object of the present invention is to visually present intrusion data in a manner which a human can readily and effectively analyze for the purpose of determining proper corrective action.

SUMMARY OF THE INVENTION

The present invention resides in a computer system, method and program for graphically representing network intrusions. Source icons are displayed in rows in a first column. The source icons represent source IP addresses from which intrusions were sent. Destination icons are displayed in rows in a second column. The destination icons represent destination IP addresses to which the intrusions were sent. The destination icons that receive intrusions from a same source icon are clustered together in the graphical representation across from the same source icon. An arrow is displayed from each of the source icons pointing to each of the destination icons to which each source icon sent an intrusion, such that there are "N" arrows from each source icon to "N" destination icons to which each source icon sent at least one intrusion.

In accordance with features of the present invention, the destination icons can be color coded based on severity levels of respective vulnerabilities of the destination icons, the destination icons can be color coded based on severity levels or numbers of security incidents relating to the destination icons and the arrows can be color coded based on numbers of intrusions represented by the arrows, respectively.

DETAILED DESCRIPTION OF THE PREFERRED EMBODIMENTS

Figure 1:
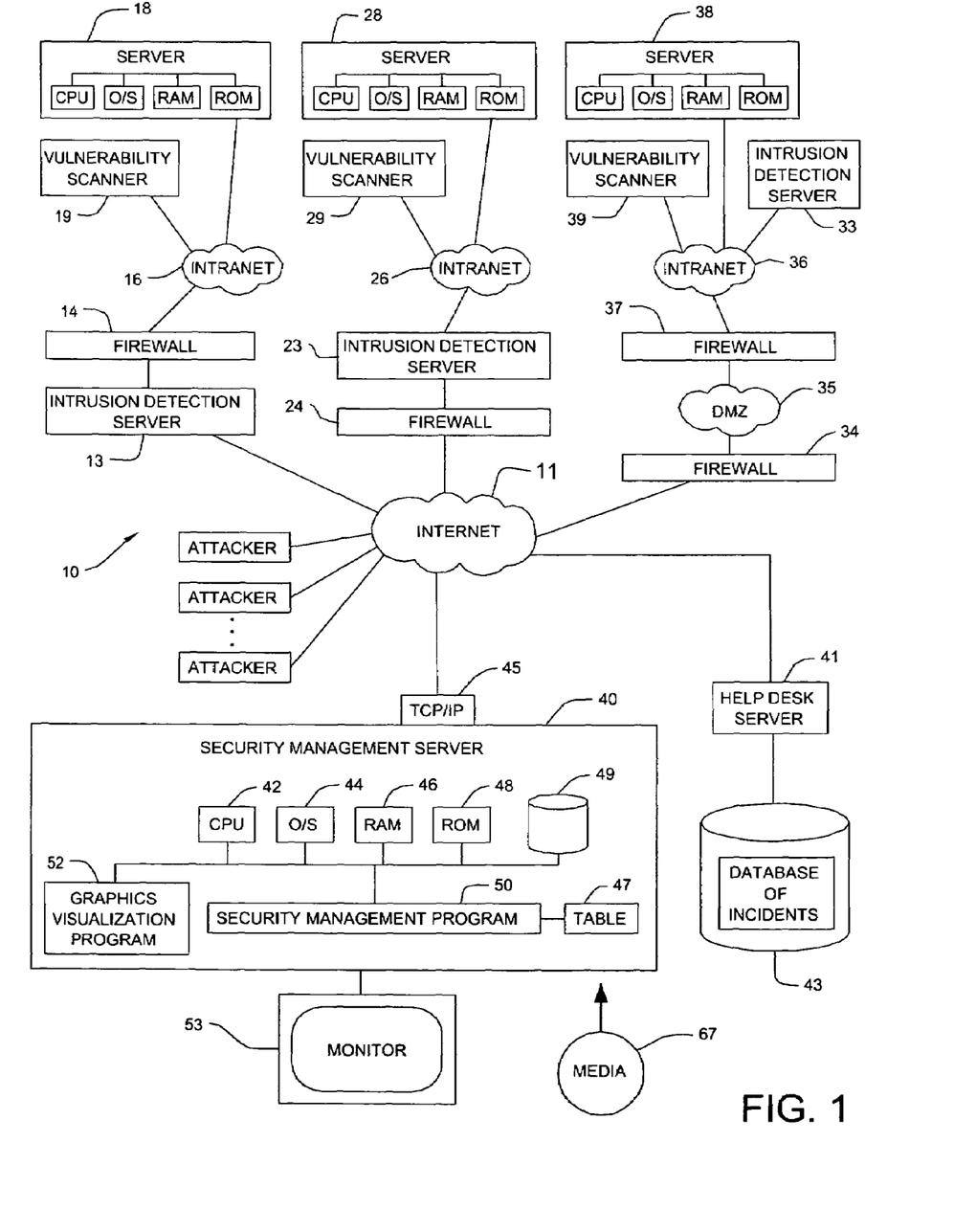
FIG. 1 is a block diagram of a distributed computer system, including a security management server with a security management program in which the present invention is embodied.

The present invention will now be described in detail with reference to the figures. FIG. 1 illustrates a distributed computer system generally designated 10. System 10 comprises an intrusion detection sensor 13 connected to the Internet 11, a firewall 14 behind the intrusion detection sensor 13, an intranet 16 behind the firewall, one or more servers 18 on the intranet 16, and a vulnerability scanner 19 on the intranet 16. System 10 also comprises another firewall 24, an intrusion detection sensor 23 connected behind the firewall, another intranet 26 behind the intrusion detection sensor 23, one or more servers 28 on the intranet 26, and a vulnerability scanner 29 on the intranet 26. System 10 also comprises another firewall 34, a "Demilitarized Zone" or semi-secure network 35 behind the firewall 34, another firewall 37 behind the DMZ, an intranet 36 behind the firewall 37, one or more servers 38 on the intranet, and a vulnerability scanner 39 and intrusion detection sensor 33 on the intranet 36. Intranets 16, 26 and 36 can be any type of private network of the enterprise that owns the servers on the same intranet. The firewalls identify and filter-out unwanted intrusions to the extent that firewall 12 can identify the intrusions to prevent them from reaching servers 18, 28 and 38 (and also prevent return messages). The foregoing components are known in the Prior Art.

The intrusion detection sensors 13, 23 and 33 detect intruding messages based on known signatures or patterns of the intrusions. The detected intrusions can take the form of viruses, worms, denial of service ("DOS") attacks, buffer overflow attacks, and any other type of attack with a signature, pattern or other detectable characteristic. A virus or worm is a computer program which disables or disrupts programs or files within the server. The signatures for viruses and worms are patterns of ones and zeros that are found in the viruses and worms as they pass through the network. A DOS comprises a large number of messages, typically sent from many source IP addresses to a single destination IP address or application, that overwhelms the application preventing the application from responding to benign/legitimate requests. A buffer overflow attack is a message containing so much information that it overflows buffers of a target application in the server causing an escalation of privileges of the attacker, allowing the attacker to gain privileged access to the application. There is a signature or pattern of each type of buffer overflow attack. When a message or group of messages match a signature or pattern of a known type of intrusion, it triggers an "alarm" in the intrusion detection sensor 13, 23 or 33 which records a description of the intrusion, i.e. source IP address, destination IP address, matching signature or pattern, time and date. The vulnerability scanners 19, 29 and 39 detect known types of vulnerabilities in the firewalls 14, 14, 34 and 37 and servers 18, 28 and 38. Examples of known types of vulnerabilities are (a) "open" ports in the servers 18, 28 and 38 which should not be open, (b) the presence/installation of obsolete software with known vulnerabilities, (c) the presence/installation of an obsolete operating system with known vulnerabilities and (d) software which is disallowed per corporate policy. An open port is a port which responds to messages from the Internet. Certain types of ports should not be open. System 10 also includes a help desk 41 that receives "help" calls from users and records the reported security incidents. Examples of security incidents are Denial Of Service, Worm Traffic, detected back end channels, suspicious computer behaviour, and known computer compromises. Typically, a help desk person fills-out an electronic form for each incident describing the nature of the incident and assigns a security level to the incident. Help desk software records in an incidents database 43, the information about the security incidents and their respective severity levels. The foregoing firewalls, types of attacks, types signatures or patterns, intrusion detection, vulnerability detection, and security incident reporting are Prior Art.

FIG. 1 also illustrates a security management server 40 according to the present invention. Security management server 40 is coupled to intrusion detection sensors 13, 23 and 33, vulnerability scanners 19, 29 and 39, and help desk server 41 via the Internet 11. Security management server 40 comprises a CPU 42, operating system 44, RAM 46, ROM 48, and storage 49 according to the Prior Art, and a security management program 50 according to the present invention. The security management server 40 may be part of a help desk center or a separate security operations center. Security Management Program 50 and Graphics Visualization Program 52 are stored on computer readable storage media 49 for execution by CPU 42 via computer readable RAM 46.

Security management program 50 resides on security management server 40 and periodically gathers records from intrusion detection sensors 13, 23 and 33 as to intrusions or attempted intrusions into servers 18, 28 and 38 (or other devices) on respective networks 16, 26 and 36. Each of the intrusion detection records lists the source IP address of the intrusion, the destination IP address of the intrusion, other destination IP addresses or "hops", if any, of the intrusion in the destination server, and the signature or pattern of the intrusion that triggered the intrusion alarm. Also, security management program 50 periodically gathers records from vulnerability scanners 19, 29 and 39 as to vulnerabilities in the servers 18, 28 and 38. Each of the vulnerability records lists the IP address of the vulnerable port, the type of vulnerability and the severity of the vulnerability. Also, security management program 50 periodically gathers incident records from database 43 indicating the IP addresses that were subject of a reported security incident and the severity level of the incident.

Next, in one embodiment of the present invention, security management program 50 organizes the intrusion data in a table 47 as follows. This table corresponds to the graphical representation of the intrusions illustrated in FIG. 2 that is displayed on monitor 53.

Example of Data in Table 47

| IP Address of Sender of Intruding Message | IP Address of Recipient of Intruding Message | Number of Intruding Messages |
| --- | --- | --- |
| 10.73.186.61 | 10.17.40.183 | 631 |
| 10.73.186.61 | 10.17.42.16 | 126 |
| 10.73.186.61 | 10.17.51.25 | 454 |
| 10.17.51.25 | 10.13.58.142 | 87 |
| 10.13.58.142 | 10.16.34.117 | 26 |
| 10.224.227.4 | 10.2.2.68 | 387 |
| 10.2.2.68 | 10.224.227.4 | 86 |
| 10.161.139.0 | 10.2.22.229 | 757 |
| 10.162.107.252 | 10.2.22.229 | 226 |
| 10.190.122.142 | 10.2.22.229 | 457 |

Table 47 also identifies which of the IP addresses are remote from the destination network, and presumed to be source IP addresses of attackers. In table 47, in a first column on the left labeled "IP Address of Sender of Intruding Message" is the IP address of the sender of each intruding message. Typically in the majority of cases, the sender will be the attacker, and the IP Address of the Sender will be the source IP address of the attacker. In table 47, the second column labeled "IP Address of Recipient of Intruding Message" is the IP address of the recipient of each intruding message. Typically in the majority of cases, the recipient will be an IP address in the destination device, such as servers 18, 28 or 38. In table 47, the third column labeled "Number of Intruding Messages" lists the number of intruding messages, that were detected by intrusion detection sensors 13, 23 and 33, that were sent from the sender IP address to the recipient IP address listed in the same row. In the illustrated example, IP Addresses 10.73.186.61, 10.224.227.4, 10.161.139.0, 10.162.107.252, and 10.190.122.142 are the source IP Addresses of attackers. In this example, source IP Address 10.73.186.61 has attacked three different destination IP addresses, i.e. 10.17.40.183, 10.17.42.16 and 10.17.51.25. The attack on destination IP address 10.17.51.25 resulted in intruding messages propagating to destination IP address 10.13.58.142 and then to destination IP address 10.16.34.117. In these cases, the propagation IP addresses, 10.17.51.25 and 10.13.58.142, in the destination device are listed in the first column as the sender of theses propagating messages. Also in this example, the attack by source IP address 10.224.227.4 on destination IP address 10.2.2.68 resulted in responses from destination IP address 10.2.2.68 back to the source IP Address 10.224.227.4. This could be a buffer overflow attack, where the responses resulted in the attacker opening back door channels to guarantee easy future access. In this case, the responding IP address, 10.2.2.68, in the destination device is also listed in the first column as the sender of the response. Also in this example, three different source IP addresses 10.161.139.0, 10.162.107.252 and 10.190.122.142 have attacked the same destination IP address 10.2.22.229, probably as a denial of service attack.

Instead of organizing the foregoing data in table 47 as shown above, program 50 can correlate the recipient IP addresses to the sending IP addresses by defining pointers from each sending IP address to each recipient IP addresses.

Figure 2:
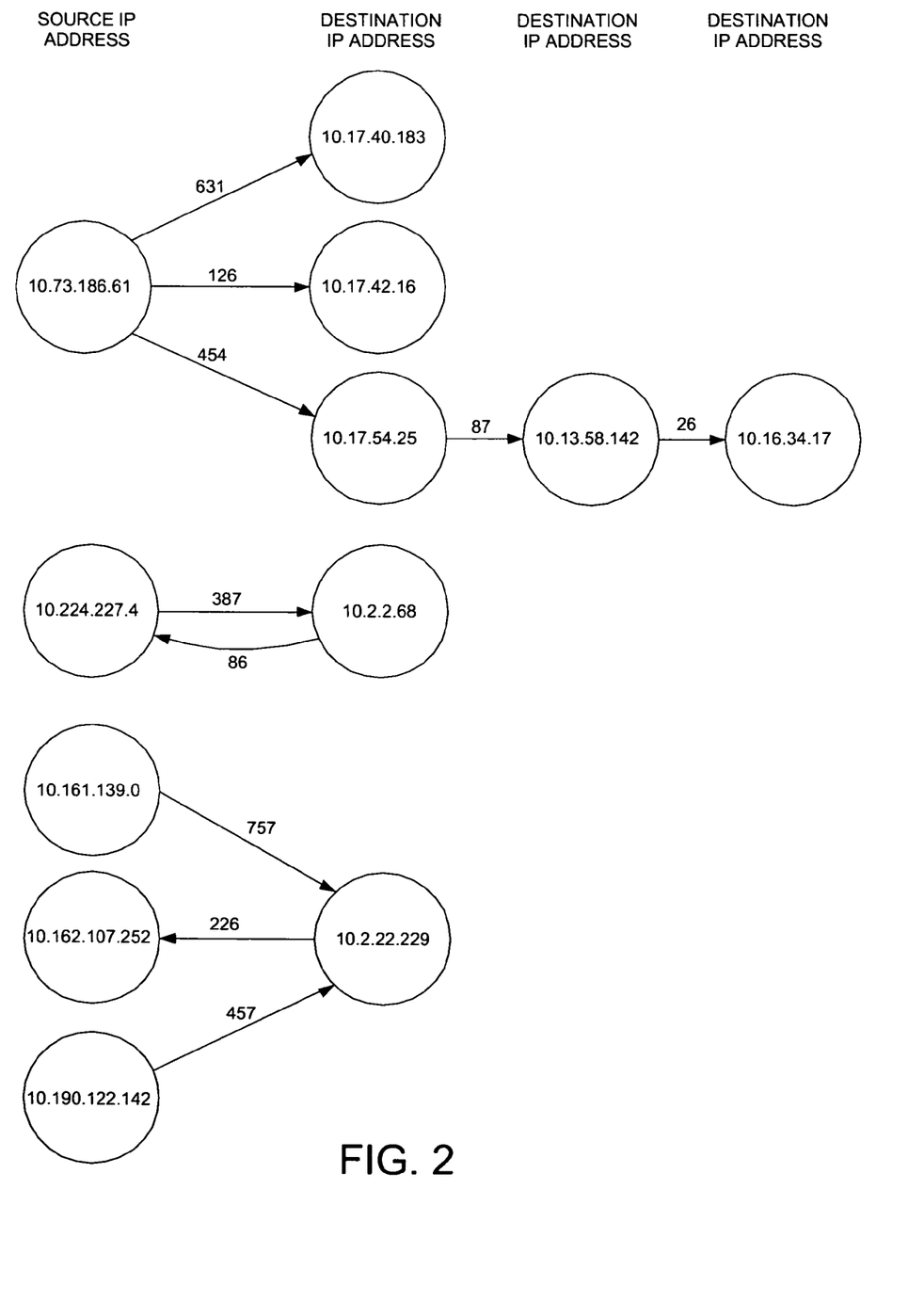
FIG. 2 is a drawing of an example of a visual, graphical representation of intrusions generated by the security management program of FIG. 1.

In some cases as noted above, an intruding message will continue on from the destination IP address of the access point to another IP address in a destination device of the destination network. For example, an intruding message can be received at an access port for a web server, and then be forwarded to a port for an application server. As another example, an intruding message can be received at an access port for a file transfer server, then be forwarded to a port for a web server, and then be forwarded to another port for a database server. In these cases of subsequent "hops" of the intruding message after receipt at the access port of the destination device, program 50 will make a record in the table 47 as shown above. In other cases as noted above, there will be an intruding message from a source IP address to a destination IP address, and a response from the destination IP address to the same source IP address. In such a case, an intrusion detection sensor detects both the attack and the response, and program 50 records both the attack and the response in table 47. An intrusion is confirmed by manual inspection of the data. The graphical representation of the message flows provided by the present invention facilitates the identifications of intrusions, and reduces the amount of time required to perform this manual inspection. The response raises additional risk and concern, because the response may include information to further assist the attacker, such as user ids and passwords, and other sensitive server configuration details such as the operating system version, application software versions which may contain known vulnerabilities that can be exploited by the attacker. Thus, table 47 describes the complete path of intruding messages and their resultant messages including messages which propagate from the access node further within the destination device, and also responsive messages. The graphical representation of FIG. 2 illustrates the complete path of the intruding messages and their resultant messages, in a manner which is readily and effectively understood by a viewer.

As noted above, program 50 recorded in the table 47, or in association with the pointers, the number of instances that each source IP address attacked, i.e. sent an intruding message to each destination IP address. In the illustrated example, source IP address 10.73.186.61 sent 631 intruding messages to destination IP address 10.17.40.183 and 126 intruding messages to destination IP address 10.17.42.16. Program 50 also recorded in table 47 the number of intruding messages that propagated from each destination IP address to another destination IP address within the destination device, for example, that destination IP address 10.17.51.25 propagated 87 messages to destination IP address 10.13.58.142. Program 50 also recorded in table 47 the number of responsive messages from a destination IP address back to the source IP address that initiated the attack, for example, that destination IP address 10.2.2.68 responded with 86 messages back to source IP address 10.224.227.4.

As explained below, the graphic representation of the intrusions includes IP address icons and arrows which illustrate the path and direction of each intruding message from each source IP address to each destination IP address, to each subsequent destination IP address, if any, and responses, if any, sent from a destination IP address back to the source IP address. The arrows correspond to the relationship of the entries in the first column to their corresponding entries in the same row in the second column or to the pointers described above. The number of intrusions will be displayed adjacent to the respective arrow, and the arrows will be color coded to indicate the magnitude of the attack. Program 50 determines the color code for each of the arrows by comparing the respective number of intruding messages (and responses) in each segment of its path to lower and upper thresholds. Arrows with intrusion numbers below the lower threshold are considered a minor problem, and are color coded green. Arrows with intrusion numbers above the lower threshold but below the upper threshold are considered an intermediate problem, and are color coded yellow. Arrows with intrusion numbers above the upper threshold are considered a major problem, and are color coded red. The IP address icon, such as an oval, represents each source IP address and each destination IP address in the path of an intruding message, or its response. The IP address represented by each icon is displayed within the icon itself. The arrows will interconnect the IP address icons, and point in the direction of the message flow, i.e., from source IP address to destination IP address of the access point, from the destination IP address of the access point to the next "hop" IP address in the destination computer system or from the destination IP address to a source IP address in the cases of a response from the destination device. Next, program 50 will determine which of the IP addresses at the destination device represent a vulnerability, as determined by the vulnerability scanners 19, 29 and 39 and reported in their records. Next, program 50 will determine which of the IP addresses have had incident reports. Next, program 50 will determine a color code for each source IP address icon and each destination IP address icon based on the severity of the respective vulnerability, and the number and severity level of security incidents involving the IP address. Program 50 will color code as "red" an IP address icon if the respective IP address has a known vulnerability which is high severity, or there have been a high number (above an upper threshold) of actual, confirmed attacks from or through the port corresponding to the IP address or there has been at least one high severity security incident report involving his IP address. A "high severity" vulnerability can mean a vulnerability which is known to be easily exploited. A "high severity" incident is an incident where the attack was known to be successful, or where compromise was highly probable. Program 50 will color code as "yellow" an IP address icon if the respective IP address has a known vulnerability which is medium severity, or there have been a medium number (above a lower threshold but below the upper threshold) of actual, confirmed attacks from or through the port corresponding to the IP address or there has been at least one medium severity security incident report involving this IP address (and no high severity security incidents involving this IP address). A "medium severity" vulnerability can mean a vulnerability which is more difficult to exploit, or from which minor damage can be inflicted by an attacker. The other IP address icons will be color coded as green. By way of example, the IP address icon for IP destination address 10.17.42.16 is color coded as green, the IP address icon for IP destination address 10.17.51.75 is color coded as yellow, and the IP address icon for IP destination address 10.17.40.183 is color coded as red.

In one embodiment of the present invention, program 50 provides to a graphics/visualization program 52 the foregoing intrusion and vulnerability information, i.e. the data in table 47 or other representation of the paths of the intruding messages and responses, if any, the number of intruding messages between each two IP addresses, and the color coding for the arrows and IP address icons. By way of example, the graphics program can be GraphViz program, or any graphics program which is capable of converting the marked up version of the data in Table 47 to a colored, directed graph. In response to the foregoing intrusion and vulnerability information, the graphics program 52 generates the display of FIG. 2.

Figure 3A:
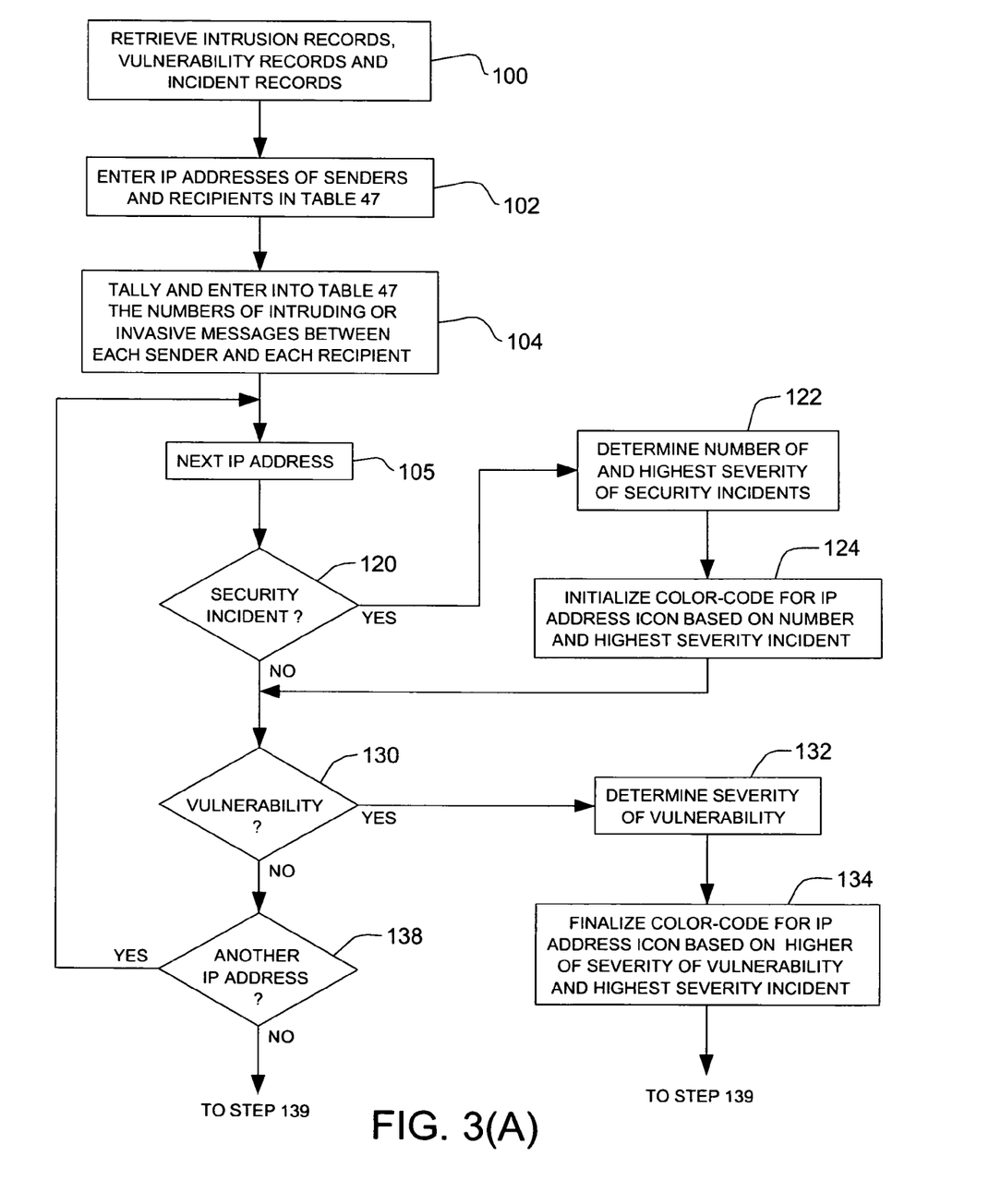
FIGS. 3(A) and 3(B) form a flow chart of the security management program of FIG. 1.
Figure 3B:
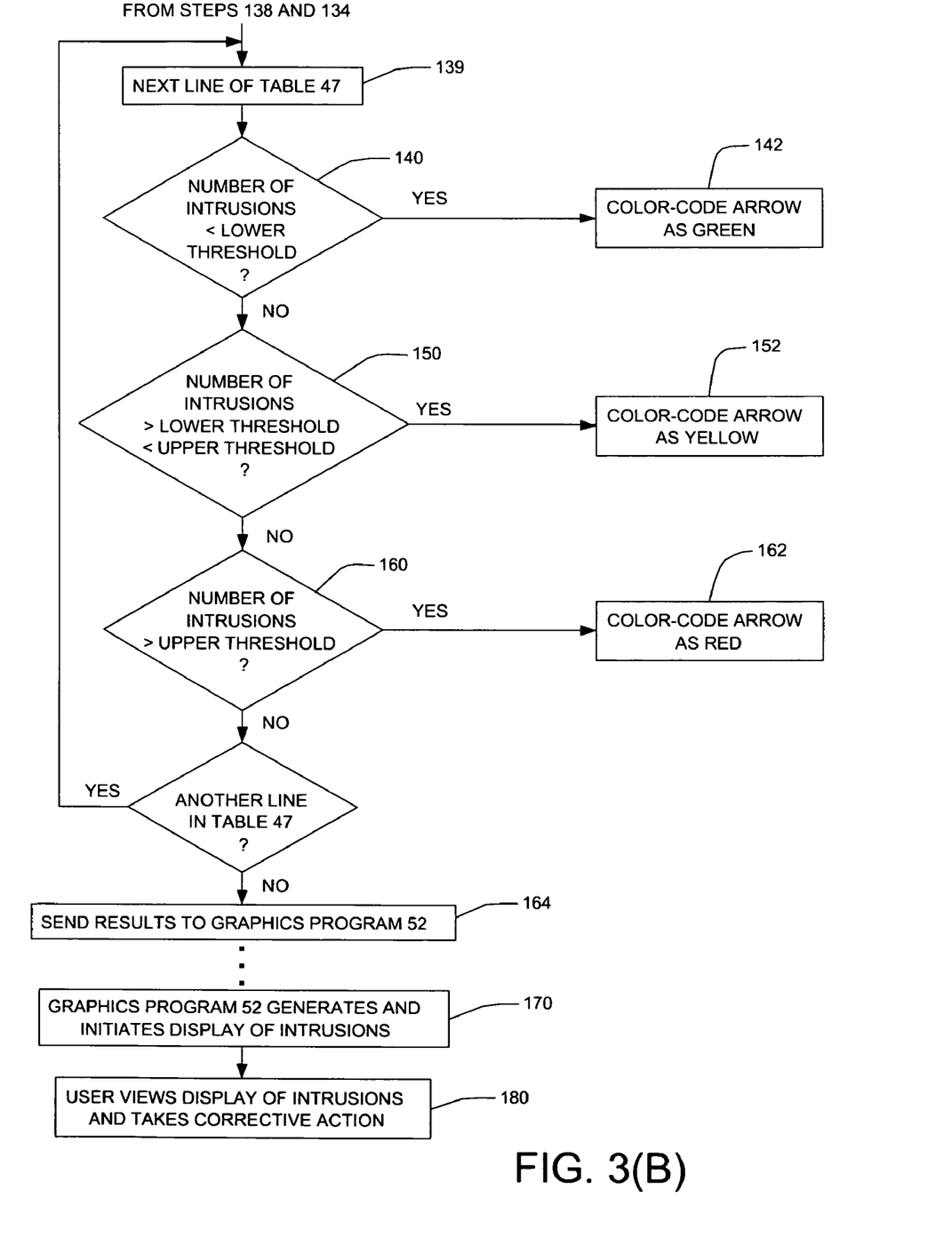

FIG. 3 illustrates the function and operation of program 50 in more detail, and also subsequent processing by graphics program 52 and a user. In step 100, program 50 retrieves the intrusion records from the intrusion detection sensors 13, 23 and 33, the vulnerability records from vulnerability scanners 19, 29 and 39, and the incident reports from incident database 43. Next, program 50 enters into table 47 the IP addresses defining the paths of the intrusions from each source IP address to and through one or more destination IP addresses in the destination device, and responses, if any (step 102). Each path comprises at least one source IP address, at least one destination IP address at an access point of the destination device, and may include one or more other destination IP addresses in the destination device as successive hops of the intruding message. Next, for each IP address (step 105), program 50 compiles and correlates the total number of intrusions between each source IP address and each destination IP address at the access point, the total number of intrusions to each successive hop of the intrusion within the destination device, and the total number of responses, if any, to the intruding messages (step 104). Next, program 50 determines color coding for the IP address icons and arrows as follows. For each source IP address and destination IP address in the table, program 50 determines from the security incident records generated at a help desk if there are one or more security incidents on record involving this IP address (decision 120). If so (decision 120, yes branch), then program 20 checks the records to determine the highest recorded severity of the incidents involving this IP address and also the total number of reported incidents involving this IP address (step 122), and then assigns a red color code for high severity, yellow color code for medium severity and green color code for low severity, based on the highest severity incident and the total number of reported incidents involving each IP address (step 124). If there were no recorded security incidents (decision 120, no branch) or after the assignment of the color code in step 124, then program 50 determines for each source IP address and destination IP address in the table, from the vulnerability records generated by the vulnerability scanners, if there is a vulnerability for this IP address (decision 130). If so (decision 130, yes branch), then program 20 checks the records to determine the vulnerability severity level of this IP address (step 132), and then assigns a red color code for high severity, yellow color code for medium severity and green color code for low severity (step 134). In the case of a difference in the color code determined in steps 124 and 134, program 50 assigns to the IP address the color code of the more severe level. If there was no vulnerability (decision 130, no branch) or after the assignment of the color code in step 134, and after the last IP address is considered (decision 138, no branch), then program 50 proceeds to step 139 and decision 140 to determine the color code for the arrows between the IP addresses as follows. If the total number of intruding messages between any two IP addresses is lower than the lower threshold (decision 140, yes branch), then program 50 assigns a green color code to the arrows (step 142). If the total number of intruding messages between any two IP addresses is greater than the lower threshold but lower than the higher threshold (decision 150, yes branch), then program 50 assigns a yellow color code to the arrow (step 152). If the total number of intruding messages between any two IP addresses is greater than the greater threshold (step 160, yes branch), then program 50 assigns a red color code to the arrow (step 162). The upper threshold can be set to a predetermined level or dynamically set as one standard deviation or another predefined number of standard deviations above the average number of intruding messages per the arithmetic mean calculated over a certain number of days. The lower threshold can be set to a predetermined level or dynamically set as one standard deviation or another predefined number of standard deviations below the average number of intruding messages per the arithmetic mean calculated over a certain number of days.

Next, program 50 supplies the foregoing data and color codes to the graphics/visualization program 52 to define the display of the graphic representation of the paths of the intrusions, number of intrusions, and security and/or vulnerability levels of the IP addresses (step 164). In response, the graphics program 52 defines and initiates the display on monitor 53, in the form illustrated in FIG. 2 (although the actual entries in the graphic representation will depend on the specific circumstances of the intrusions) (step 170). In response, the user can view the graphic representation, readily assess the security and vulnerability situation, and take corrective action (step 180). Examples of corrective action are the following: (a) notify a firewall administrator to update the firewall configuration/access rules or automatically update the firewall configuration/access rules to block messages to and from source IP addresses sending intruding messages, (b) notify an administrator of the destination device(s) that have received intruding messages to close certain ports or automatically close certain ports, which are open, vulnerable and have received intrusions, (c) notify an administrator that a computer which has been colored red because it has a high vulnerability associated with it or has been involved in a high severity incident is receiving a high number of attack signatures as well, and requires immediate attention and/or (d) notify an administrator to remedy other types of vulnerabilities indicated by the graphic representation.

Program 50 can be loaded into server 40 from a computer readable media 67 such as magnetic tape or disk, optical disk, DVD, semiconductor memory, memory stick, etc. or downloaded from the Internet via TCP/IP adapter card 45.

Based on the foregoing, a system, method and program for graphically presenting intrusion data have been disclosed. However, numerous modifications and substitutions can be made without deviating from the scope of the present invention. For example, the orientation of the graphical display of FIG. 2 can be rotated ninety degrees such that the source IP addresses are in a row at the top (or bottom) and the destination IP addresses are in columns below (or above) the associated source IP addresses. Therefore, the present invention has been disclosed by way of illustration and not limitation, and reference should be made to the following claims to determine the scope of the present invention.

What is claimed:

1. A method for graphically representing network intrusions, the method comprising the steps of:
   a computer identifying intrusions sent from a source Internet Protocol (IP) address to a destination IP address and determining a color-code based on a number of the intrusions sent from the source IP address to the destination IP address; and
   the computer displaying on a monitor concurrently:
   a source icon representing the source IP address,
   the source IP address in association with the source icon,
   a destination icon representing the destination IP address,
   the destination IP address in association with the destination icon,
   a first arrow pointing from the source icon to the destination icon representing intrusions sent from the source IP address to the destination IP address, the first arrow being color-coded based on the number of intrusions sent from the source IP address to the destination IP address, and wherein the computer also identifies a response to the source IP address from the destination IP address to the intrusion sent from the source IP address, and displays concurrently on the monitor an arrow from the destination icon pointing to the source icon representing the response to the source IP address from the destination IP address to the intrusion sent from the source IP address.

2. The method of claim 1 wherein the source IP address is displayed within the source icon, and the destination IP address is displayed within the destination icon.

3. The method of claim 1 further comprising the step of:
the computer color coding the destination icon based on a severity level of the intrusions sent to the destination IP address.

4. The method of claim 1 further comprising the step of:
the computer color coding the destination icon based on a vulnerability of a destination device at the destination IP address.

5. The method of claim 1 further comprising the steps of:
the computer determining that one of the intrusions sent from the source IP address to the destination IP address was propagated from the destination IP address to another destination IP address; and
the computer also displaying concurrently on the monitor another destination icon representing the other destination IP address, and another arrow from the first said destination icon to the other destination icon to represent the intrusion that was propagated from the first said destination IP address to the other destination IP address.

6. The method of claim 1 further comprising the step of:
the computer also displaying concurrently on the monitor adjacent to the arrow, a number of intrusions sent from the source IP address to the destination IP address.

7. The method of claim 1 further comprising the step of the computer notifying an administrator to reconfigure a destination device at the destination IP address to block subsequent messages from the source IP address.

8. A computer system for graphically representing network intrusions, the system comprising:
a computer processing unit (CPU), a computer readable memory and a computer readable storage media;
first program instructions to identify intrusions sent from a source Internet Protocol (IP) address to a destination IP address and determine a color-code based on a number of the intrusions sent from the source IP address to the destination IP address; and
second program instructions to direct concurrent display on a monitor of the following:
a source icon representing the source IP address,
the source IP address in association with the source icon,
a destination icon representing the destination IP address,
the destination IP address in association with the destination icon, and
a first arrow pointing from the source icon to the destination icon representing intrusions sent from the source IP address to the destination IP address, the first arrow being color-coded based on the number of intrusions sent from the source IP address to the destination IP address; wherein
the first and second program instructions are stored on the computer readable storage media for execution by the CPU via the computer readable memory; and
wherein the first program instructions also identify a response to the source IP address from the destination IP address to the intrusion sent from the source IP address, and the second program instructions also direct concurrent display on the monitor of an arrow from the destination icon pointing to the source icon representing the response to the source IP address from the destination IP address to the intrusion sent from the source IP address.

9. The computer system of claim 8 wherein the source IP address is displayed within the source icon, and the destination IP address is displayed within the destination icon.

10. The computer system of claim 8 wherein the second program instructions also direct concurrent display on the monitor of the destination icon in a color-code based on a severity level of the intrusions sent to the destination IP address.

11. The computer system of claim 8 wherein the second program instructions also direct concurrent display on the monitor of the destination icon in a color-code based on a vulnerability of a destination device at the destination IP address.

12. The computer system of claim 8 wherein:
the first program instructions determine that one of the intrusions sent from the source IP address to the destination IP address was propagated from the destination IP address to another destination IP address; and
the second program instructions also direct concurrent display on the monitor of another destination icon representing the other destination IP address, and another arrow from the first said destination icon to the other destination icon to represent the intrusion that was propagated from the first said destination IP address to the other destination IP address.

13. The computer system of claim 8 wherein the second program instructions also direct concurrent display on the monitor, adjacent to the arrow, of a number of intrusions sent from the source IP address to the destination IP address.

14. A computer program product for graphically representing network intrusions, the computer program product comprising:
a computer readable storage media;
first program instructions to identify intrusions sent from a source Internet Protocol (IP) address to a destination IP address and determine a color-code based on a number of the intrusions sent from the source IP address to the destination IP address; and
second program instructions to direct concurrent display on a monitor of the following:
a source icon representing the source IP address,
the source IP address in association with the source icon,
a destination icon representing the destination IP address,
the destination IP address in association with the destination icon, and
a first arrow pointing from the source icon to the destination icon representing intrusions sent from the source IP address to the destination IP address, the first arrow being color-coded based on the number of intrusions sent from the source IP address to the destination IP address; wherein
the first and second program instructions are stored on the computer readable storage media; and
wherein the first program instructions also identify a response to the source IP address from the destination IP address to the intrusion sent from the source IP address, and the second program instructions also direct concurrent display on the monitor of an arrow from the destination icon pointing to the source icon representing the response to the source IP address from the destination IP address to the intrusion sent from the source IP address.

15. The computer program product of claim 14 wherein the source IP address is displayed within the source icon, and the destination IP address is displayed within the destination icon.

16. The computer program product of claim 14 wherein the second program instructions also direct concurrent display on the monitor of the destination icon in a color-code based on a severity level of the intrusions sent to the destination IP address.

17. The computer program product of claim 14 wherein the second program instructions also direct concurrent display on the monitor of the destination icon in a color-code based on a vulnerability of a destination device at the destination IP address.

18. The computer program product of claim 14 wherein:
the first program instructions determine that one of the intrusions sent from the source IP address to the destination IP address was propagated from the destination IP address to another destination IP address; and
the second program instructions also direct concurrent display on the monitor of another destination icon representing the other destination IP address, and another arrow from the first said destination icon to the other destination icon to represent the intrusion that was propagated from the first said destination IP address to the other destination IP address.

19. The computer program product of claim 14 wherein:
the second program instructions also direct concurrent display on the monitor, adjacent to the arrow, of a number of intrusions sent from the source IP address to the destination IP address.

\* \* \* \* \*